A. E. KINSLEY.
GAME TRAP.
APPLICATION FILED AUG. 2, 1916.
1,238,525.
Patented Aug. 28, 1917.
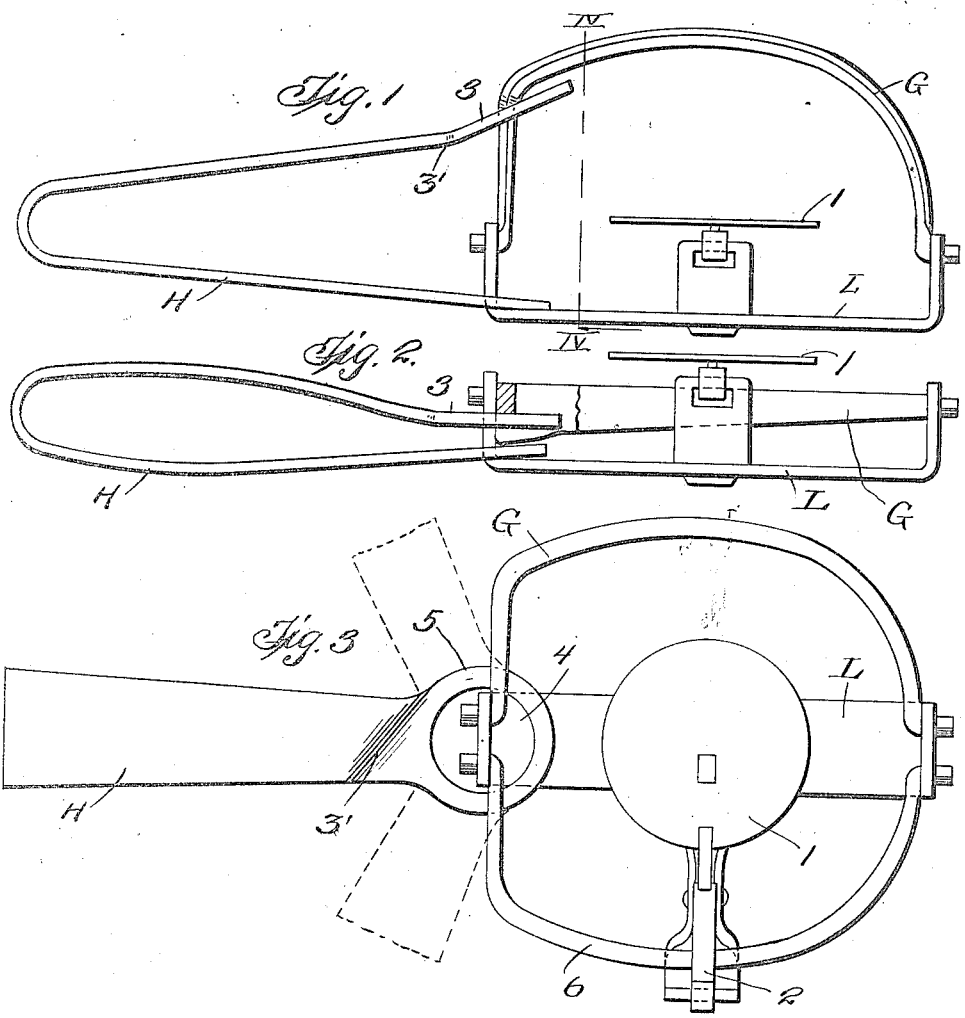
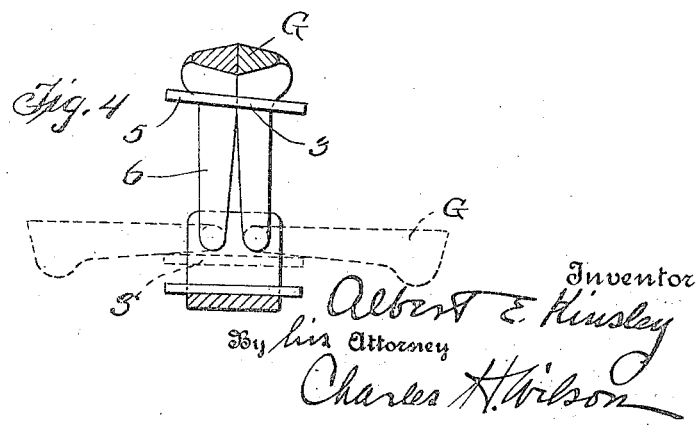

UNITED STATES PATENT OFFICE.

ALBERT E. KINSLEY, OF ONEIDA, NEW YORK, ASSIGNOR TO TRIUMPH TRAP CO. INC., OF ONEIDA, NEW YORK, A CORPORATION OF NEW YORK.

GAME-TRAP.

1,238,525.  Specification of Letters Patent.  Patented Aug. 28, 1917.

Application filed August 2, 1916. Serial No. 112,734.

*To all whom it may concern:*

Be it known that I, ALBERT E. KINSLEY, residing at Oneida, in the county of Madison and State of New York, have invented certain new and useful Improvements in Game-Traps, of which the following is a specification.

This invention relates to an animal trap, and particularly to means for improving the operation and general effectiveness thereof.

A more detailed object is to provide a simple means whereby when the jaws of the trap are open, that is in "set" position, the two jaws will lie in substantially a common horizontal plane.

In traps of the type to which this invention relates one of the jaws, when "set," is held rigidly by its engagement with the trigger. The other jaw has no retaining means but is free to move upwardly and usually does move upwardly at more or less of an angle under the slight pressure of the adjacent side of the controlling spring. Also the controlling spring as heretofore constructed has been of such shape that when in "set" position the upper leg thereof is bowed upwardly to such an extent that there is a considerable downward inclination of the end of said leg. Owing to this inclination it has always been a common objection that the spring could not be thrown around out of longitudinal alinement with the remainder of the trap without causing or permitting the unrestrained jaw to move out of its intended desirable position. If the spring be thrown around in a direction toward the trigger, then a relatively low part of the end of the spring is brought beneath the unrestrained jaw and said jaw is liable to drop, whereas if the spring is thrown around in the opposite direction a relatively high portion of the spring is brought beneath the unrestrained jaw and causes said jaw to be swung upwardly, sometimes to a very objectionable degree.

It is the object of this invention to overcome these defects and to provide means whereby the spring may be freely thrown from one side to the other, almost to right angular positions, without producing any swinging action of the jaws.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a side elevational view of a trap constructed in accordance with the principles of this invention, the same being shown in normal position.

Fig. 2 is a similar view but illustrating the parts of the trap in "set" position.

Fig. 3 is a top plan view of the trap as shown in Fig. 2; and

Fig. 4 is a transverse sectional view taken upon the plane of line IV—IV of Fig. 1, the jaws being shown by dotted lines in their "set" position.

Referring to the drawings for a detailed description of the structure illustrated therein, the reference character L indicates the base plate of the trap, G indicates the jaws, and H indicates the spring. The base plate and jaws are of the usual construction common to the type of trap illustrated, the base plate carrying the customary bait plate 1 and trigger 2. The spring H is not of the customary construction, however, except as to its general U-shaped form and proportions. It is different in that the end portion 3 of its upper leg is bent upwardly along a line drawn obliquely to the length of the spring as shown at 3' in the drawings, the bent portion including the entire region of the aperture 4 therein.

The angle of the bend of the portion 3 is such that when the jaws G are thrown open and the spring is compressed said portion 3 will stand in a substantially horizontal position, that is, in a position parallel to the general plane of the two jaws.

It is apparent that when the portion 3 is in such horizontal position the spring may be swung to either one side or the other, as suggested by the dotted lines in Fig. 3, and still maintain an engagement with the jaws in substantially the same plane as when the spring is in its normal position alined with the base plate L.

This is important in that it is frequently necessary or desirable to swing the spring to one side or the other in practice. Certain rocks, trees, stakes, or the like, may stand in the way of an advantageous setting of the trap, unless the spring can be swung around. Heretofore trappers have been restrained from swinging the spring due to the fact that it has always resulted in causing one or the other of the jaws to be moved out of proper position.

As shown in Fig. 4 of the drawings, the portion 3 of the spring is also normally tilted somewhat so that a relatively high side, as 5 thereof, stands to engage the jaw 6 which is adapted to be held by the trigger 2. This inclined position is only present when the jaws are closed. When the jaws are open or "set" the pressure of the jaws 6 against the raised portion 5 causes said portion 5 to become depressed with the result that the inclination is no longer present, as shown by the dotted lines in Fig. 4.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:—

1. A spring for animal traps comprising a member bent upon itself into U-shape, the end portion of one leg of the spring being adapted to engage the jaws of the trap for operating said jaws, and said end portion being bent obliquely out of a plane parallel with the other of said legs when the jaws are in closed position but which is adapted to be moved into a plane parallel with the other leg when the jaws are in set position.

2. A spring for animal traps comprising a member bent upon itself into U-shape, the end portion of one leg of the spring being adapted to engage the jaws of the trap for operating said jaws, and said end portion being bent upwardly obliquely away from the second leg out of the plane of the remainder of the first leg.

3. A spring for animal traps comprising a member bent upon itself into U-shape, the end portion of one leg of the spring being adapted to engage the jaws of the trap for operating said jaws, the mentioned end of said leg being adapted to be pressed toward the end of the second leg when the jaws are in a "set" position, and said mentioned end being disposed when so compressed to stand in a plane substantially parallel with the general plane of said jaws.

4. In a trap of the class described, comprising a pair of swinging jaws and a U-shaped spring for operating said jaws, said spring being connected to stand in a normal position but being adapted to be swung to either side of its normal position when the jaws are "set," one leg of said spring having the jaw engaging part so disposed with relation to the plane of said jaws when in set position that the latter will remain in full "set" position notwithstanding the swinging movement of the spring.

5. A spring for animal traps comprising a member bent upon itself into U-shape, the end portion of one leg of the spring being adapted to engage the jaws of the trap for operating said jaws, and said end portion being bent away from the second jaw and being also obliquely tilted with respect to the second jaw substantially as described.

In testimony whereof I affix my signature in the presence of two witnesses.

ALBERT E. KINSLEY

Witnesses:
DONALD D. FRIER,
HOLDRIDGE G. GREENE.